United States Patent [19]

Levy et al.

[11] Patent Number: 5,657,810

[45] Date of Patent: Aug. 19, 1997

[54] SCREENING DEVICE FOR VEHICLE WINDOWS

[76] Inventors: Simon Levy, 4219 12th Ave., #3D, Brooklyn, N.Y. 11219; Vladimir Tsigrik, 2203 Ave. X, 2nd fl., Brooklyn, N.Y. 11235

[21] Appl. No.: 666,220

[22] Filed: Jun. 20, 1996

[51] Int. Cl.$^6$ .................................................. B60J 3/02
[52] U.S. Cl. ........................................ 160/370.21; 160/134
[58] Field of Search ..................... 160/134, 84.07, 160/84.02, 370.21, 370.22, DIG. 2, DIG. 3, 62, 61, 53; 296/97.4, 97.7, 97.8

[56] References Cited

U.S. PATENT DOCUMENTS

| | | | |
|---|---|---|---|
| 4,332,414 | 6/1982 | Surtin | 160/134 X |
| 4,537,040 | 8/1985 | Ibrahim | 160/84.07 X |
| 4,606,572 | 8/1986 | Maguire | 160/134 X |
| 4,681,149 | 7/1987 | Tung-Chow | 160/134 |
| 4,699,195 | 10/1987 | Lester | 160/DIG. 3 X |
| 4,745,960 | 5/1988 | Karp | 160/84.07 |
| 4,861,090 | 8/1989 | Gavrieli | 160/134 |
| 5,010,939 | 4/1991 | King | 160/134 X |
| 5,042,550 | 8/1991 | Yee | 160/370.23 X |
| 5,076,633 | 12/1991 | Hsu et al. | 160/370.22 X |
| 5,117,889 | 6/1992 | Coe | 160/134 |

FOREIGN PATENT DOCUMENTS

| 1256866 | 12/1961 | France | 160/134 |
|---|---|---|---|

*Primary Examiner*—David M. Purol
*Attorney, Agent, or Firm*—Ilya Zborovsky

[57] ABSTRACT

A device for screening a vehicle window, has a plurally of strip-shaped elongated elements together forming a screening element and having two opposite ends, the strip-shaped elements being connected with one another in a region of one of their ends and pivotal relative to one another from an inoperative position in which the opposite ends are located near one another and the strip-shaped elements are coextensive to one another and extend substantially horizontally, and an operative position in which the opposite ends of the strip-shaped elements are spaced from one another circumferentially the screening element forms a segment arranged to be located near a vehicle window so as to screen the latter, and an electric motor for moving the strip-shaped elements between the inoperative and the operative positions.

14 Claims, 3 Drawing Sheets

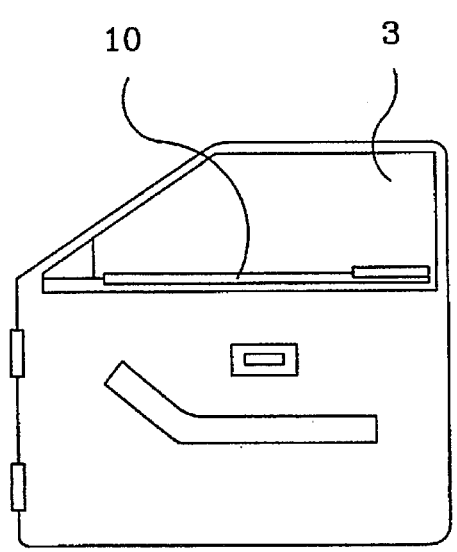
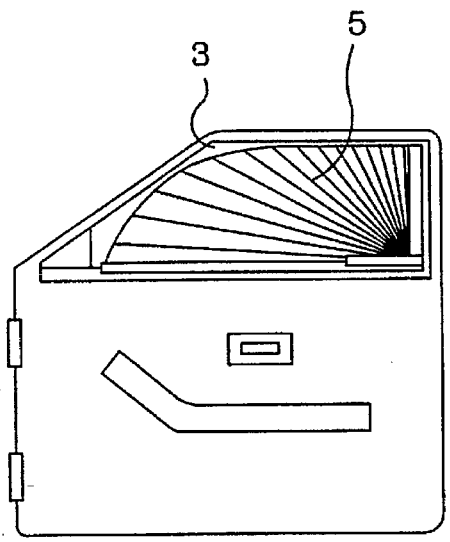
FIG.3A  FIG.3B
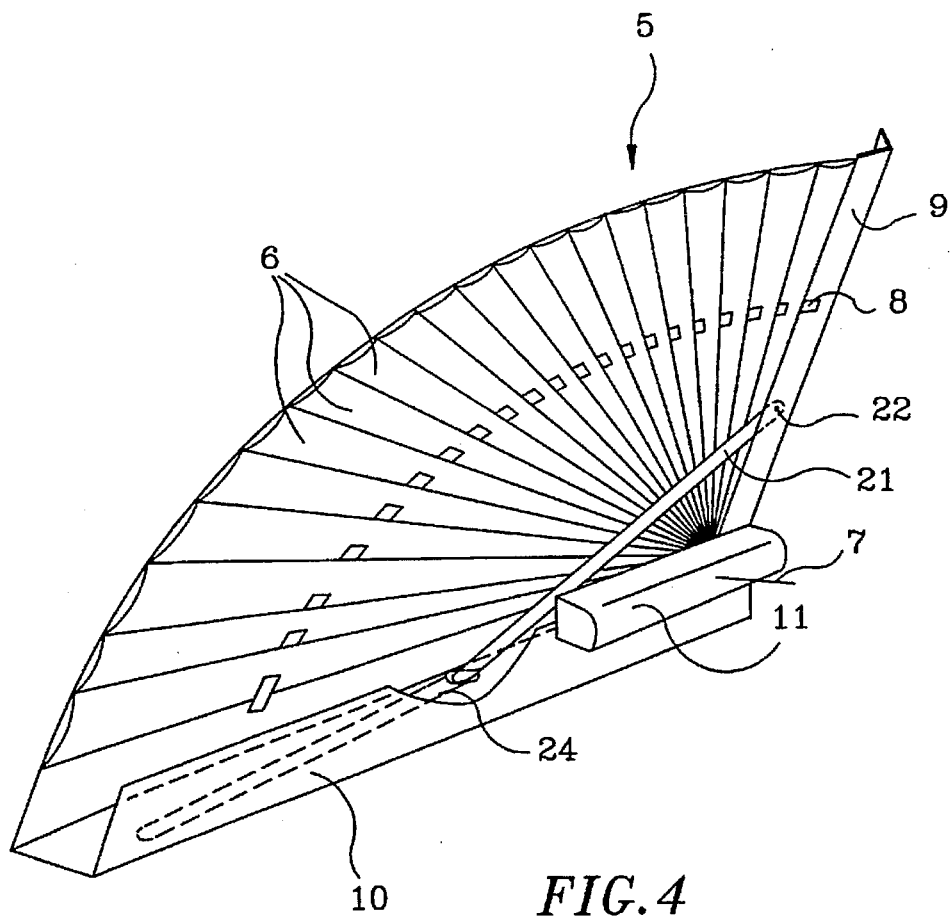
FIG.4

SCREENING DEVICE FOR VEHICLE WINDOWS

BACKGROUND OF THE INVENTION

The present invention relates to a screening device for vehicle windows.

The vehicle windows are usually provided with a transparent glass panes to guarantee visibility of outside environment during driving. At the same time, in the position when the vehicle is not moving and parked temporarily or permanently, sun rays penetrate through the glass and the interior of the vehicle is faded under the action of sun radiation. Also, in some instances, an occupant of the vehicle who remains in it is willing to get privacy by making the windows non-transparent.

The devices which are currently on the market include pieces of cardboard or plastic which the vehicle driver manually places in corresponding areas of the vehicle to close the windshield, the rear window and the side windows. It is believed that such devices can be further improved.

SUMMARY OF THE INVENTION

Accordingly, it is an object of the present invention to provide a device for screening vehicle windows which is a further improvement of the existing devices.

In keeping with these objects and with others which will become apparent herein after, one feature of the present invention resides, briefly stated, in a device for screening vehicle windows which has a plurality of elongated strip-shaped elements pivotally connected with one another at their one end and moveable between a folded position in which the strip-like elements are coextensive with one another and an unfolded operative position in which they extend radially and their opposite ends are spaced from one another in a circumferential direction so as to form a segment adapted to be placed over a window pane of a vehicle, and means for moving said strip-shaped elements between the operative position and the inoperative position and including electric motor means operable from a board electric system of a vehicle.

When the device is designed in accordance with the present invention, the vehicle occupant activates the electric motor and moves the strip-shaped elements of the device from the inoperative position; in which the strip-shaped elements are located near the lower edge of the vehicle window, to an operative position, in which the strip-shaped elements are unfolded and cover the vehicle window or corresponding part of it. It is to be understood that the strip-shaped elements are non-transparent and screen the sunlight.

In accordance with a further advantageous feature of the present invention, the device is provided with a back-support, so that in the operative position when the strip-shaped elements are unfolded, the back support supports them from buckling away from the window and inwardly of the vehicle. The back support can be formed as a rigid strip which is connected with one end of the device and overlaps a portion of the segment formed by the strip-shaped elements in the operative position. During movement from the operative position to inoperative position, the opposite end of the strip of the back support slides in a slot on the housing of the device.

In accordance with still a further important feature of the present invention, the device is provided with an end holder holding the side-most strip-shaped element, a screw turnable by the electric motor, a nut arranged on the screw and moveable along the screw when the screw is turned by the motor, and a fixed projection connected with the holder and slideable vertically in the groove of the nut, wherein a curved slot is provided in a part of the device to guide the projection, so that during the displacement of the nut the projection is guided to move arcuately in the curved slot and vertically in the groove of the nut so as to turn the strip-shaped elements between the operative position and the inoperative position.

The novel features which are considered as characteristic for the present invention are set forth in particular in the appended claims. The invention itself, however, both as to its construction and its method of operation, together with additional objects and advantages thereof, will be best understood from the following specification and description of specific embodiments when read in connection with the accompanying drawing.

BRIEF DESCRIPTION OF THE DRAWINGS

FIGS. 3A and 3B are views showing a vehicle door with a window and the inventive device in the inoperative position and in the operative position correspondingly;

FIG. 4 is a view showing a screening element of the inventive screening device in an unfolded operative position;

DESCRIPTION OF PREFERRED EMBODIMENTS

Figure 5:
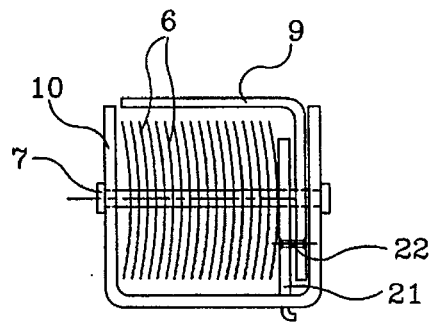
FIG. 5 is an end view of the screening element in the folded inoperative position.
Figure 6A:
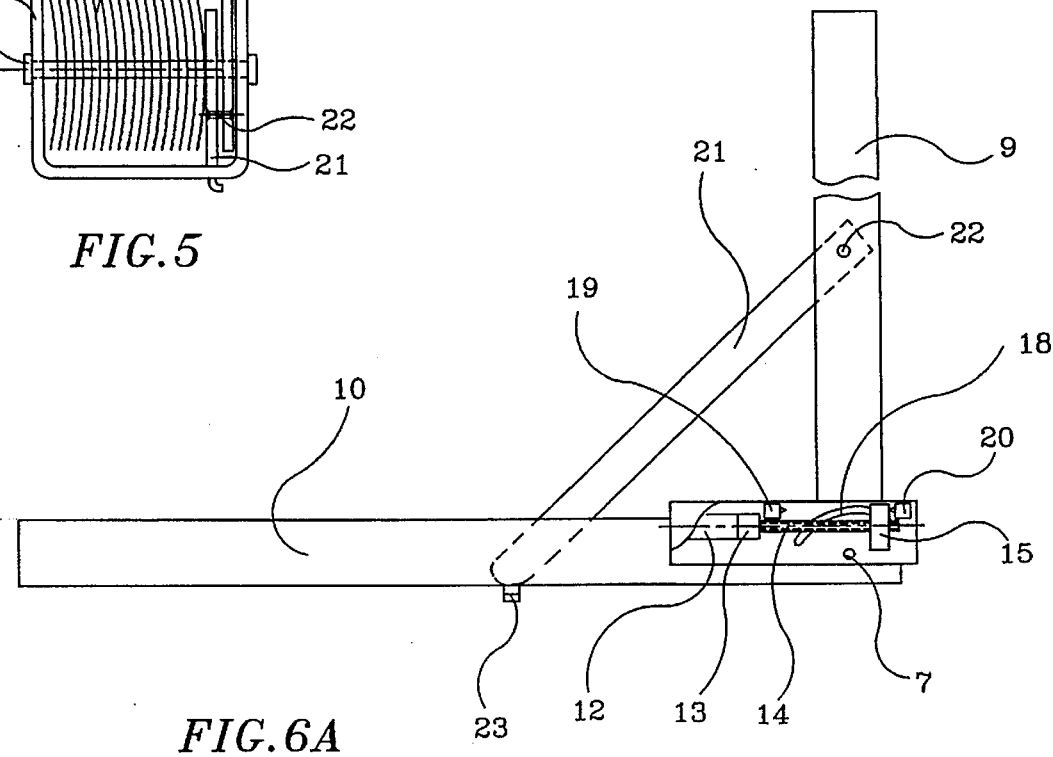
FIGS. 6A and 6B are a side view and a top view of main components of the inventive screening device without the screening element.
Figure 6B:
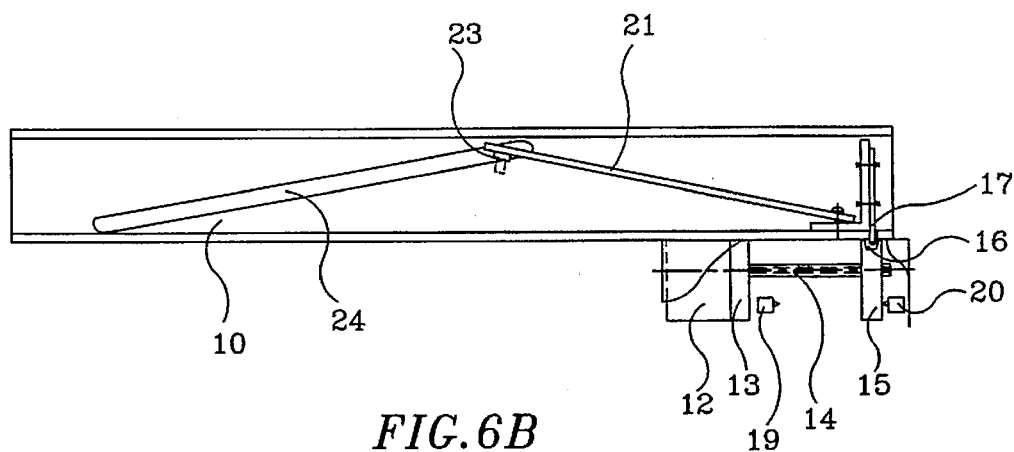

The device designed in accordance with the present invention is used for screening windows of a vehicle identified as a whole with a reference numeral 1. Conventionally, the vehicle 1 has a windshield 2, side windows 3 and a rear window 4. Each window of the vehicle 1 can be provided with a screening device in accordance with the present invention. The windshield 2 can be provided with two screening devices as shown FIGS. 2A and 2B, the rear window of the vehicle can also be provided with not shown two screening devices, while each door of the vehicle can be provided with one screening device as shown in FIGS. 3A and 3B. The screening device has a screening element 5 which is composed of a plurality of strip-shaped elements 6 pivotally connected with one another by a pivot axle 7. An elastic cord 8 connected with strip-shaped elements in a region which is radially spaced from the pivot axle 7. An angular elongated holder 9 is located at one side of the screening element 5 in an unfolded operative position of the device, while a housing box 10 extends substantially horizontally and in the shown operative position of FIG. 4 is associated with the other end strip-shaped element 6. The ends of the cord 8 are connected with the elements 9 and 10. The screening element 5 is moveable between an operative position shown in FIG. 4, in which the opposite ends of the strip-shaped element 6 are spaced from one another in a circumferential direction and the screening element 5 assumes a segment shape, and the inoperative position shown in FIG. 5 in which the strip-shaped elements 6 are accommodated in the box 10 and arranged coextensive with one another in a horizontal direction. The box 10 is mounted horizontally inside the vehicle along the lower edge of a respective window of the vehicle.

The casing 11 accommodates an electric motor 12 with a reducing transmission 13 for turning an elongated screw 14 and nut 15 arranged on the screw 14 and a vertical slot 16. The angular holder 9 is provided with a projection 17 whose end extends in the slot 16. The end wall of the casing 11 is provided with an arcuate slot 18 through which the projection 17 passes to be inserted with its end into the vertical slot 16. Two end switches 19 and 20 are located at opposite ends of nut 15 and more particularly at the points corresponding to the operative and the inoperative positions of the screening element 5 as will be explained herein below.

The device is further provided with a back support for the strip-shaped elements. The back support includes a rigid strip 21 which is pivotally connected by a pivot axis 22 with the holder 9 at one end and has a projection 23 at the other end. The projection 23 is introduced into a slot 24 in the bottom wall of the box 10. Finally, a switch 25 is provided for actuating of the device.

Figure 1:
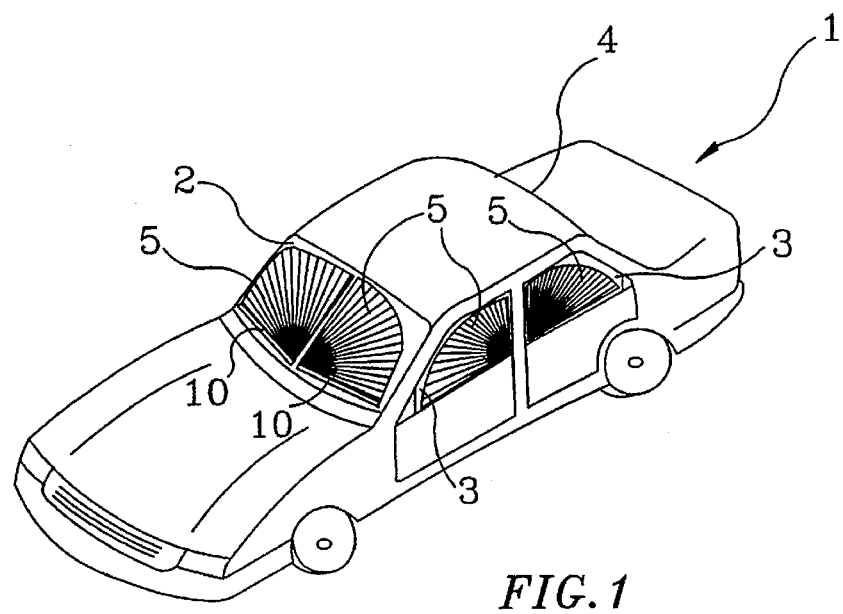
FIG. 1 is a perspective view of a vehicle provided with the inventive device for screening vehicle windows.
Figure 2A:
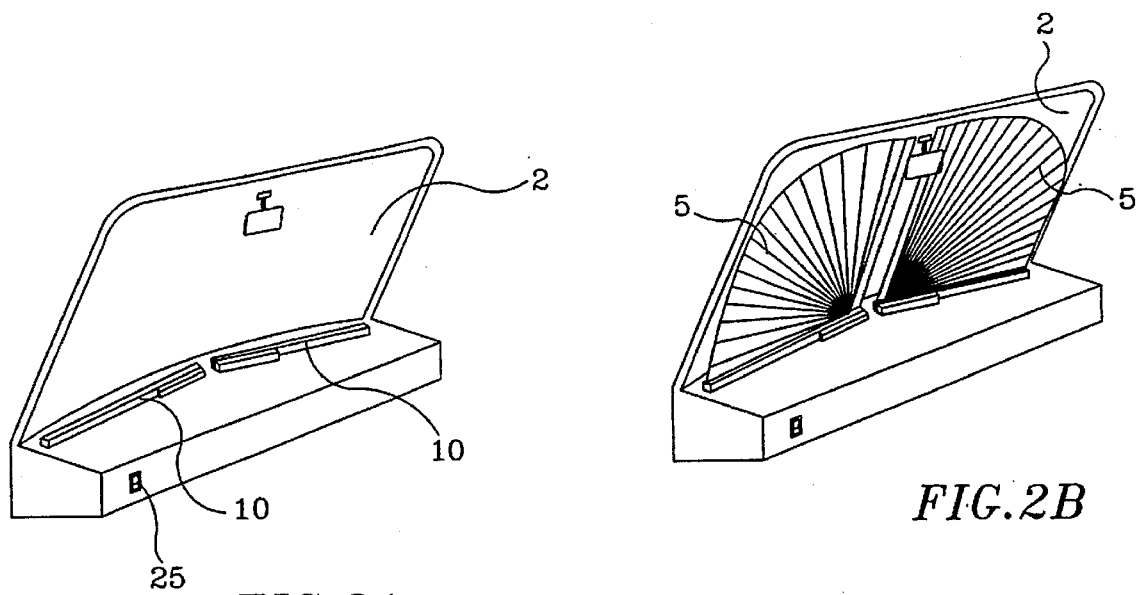
FIGS. 2A and 2B are views showing a windshield and a dashboard of the vehicle with the inventive device in an inoperative position and in an operative position correspondingly.
Figure 2B:
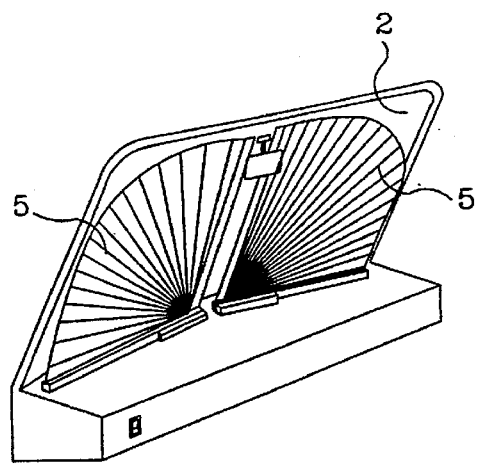

The device operates in a following manner:

In order to transfer the device from the inoperative position shown in FIGS. 2A and 3A, vehicle occupant activates the switch 25 so that the electric motor 12 is energized and rotates the screw shaft 14 through the transmission 13. The nut 15 displaces rectilinearly along the screw shaft 14 and purges the projection 17 of the holder 9 so that it moves along the curved slot 18 and thereby the holder 19 turns from the horizontal position shown in FIGS. 2A and 3A to the vertical position shown in 2B and 3B, thus turning the strip-shaped elements 6 around the axle 7 and opening the screening element 5 to form a segment which covers a part of the window or a whole window. When the nut 15 reaches its end position, it activates the end switch 20 which turns off the motor 12 and stops the movement of the device.

In order to move device from the operative position into the inoperative position, the switch 25 is again activated by the vehicle occupant. The second activation reverses the current flow in the electric motor 12, so that it rotates the screw shaft 14 in the opposite direction, causing the rectilinear displacement of the nut 14 in the opposite direction. The projection 17 of the holder 9 moves arcuately along the path 18 in the opposite direction and folds the screening element 5 so that the strip-shaped elements 6 assume the horizontal coextensive position in the box 10. At the end of the displacement, the nut 15 activates the end switch 19, and the electric motor 12 is turned off.

It will be understood that each of the elements described above may also find a useful application in other types of screening devices for vehicle windows. The invention is not intended to be limited to the details shown, since various modifications may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in particular in the appended claims:

1. A device for screening a vehicle window, comprising a plurality of strip-shaped elongated elements together forming a screening element and having two opposite ends, said strip-shaped elements being connected with one another in a region of one of their ends and pivotal relative to one another from an inoperative position in which the opposite ends are located near one another and said strip-shaped elements are coextensive to one another and extend substantially horizontally, and an operative position in which the opposite ends of said strip-shaped element are spaced from one another circumferentially said screening elements forms a segment arranged to be located near a vehicle window so as to screen the vehicle window; means for moving said strip-shaped elements between said inoperative and said operative positions and including electric motor means; means for supporting rearwardly said strip-shaped elements in said operative positions so as to prevent their rearward buckling, said supporting means including a rigid strip pivotally connected with an end one of said strip-shaped elements at one end and moveable at the other end, and a box in which said strip-shaped elements are arranged in said inoperative position, said box being provided with a slot, said other end of said rigid strip having an engaging formation moveable in said slot during movement of said screening element between said operative position and said inoperative position.

2. A device as defined in claim 1, wherein said motor means is operative from an electrical board system of the vehicle.

3. A device as defined in claim 2, wherein said electric motor is a double-acting electric motor which can rotate in two opposite directions.

4. A device as defined in claim 1, and further comprising a box arranged to accommodate said strip-shaped elements in said inoperative position, and a holder connected with an end one of said strip-shaped elements and also arranged inside said box in said inoperative position, but in said operative position being circumferentially spaced from said box so as to extend substantially vertically.

5. A device as defined in claim 4, and further comprising a cord element elastically connecting said strip-shaped elements with one another.

6. A device as defined in claim 1, and further a screw shaft turnable by said electric motor, a nut longitudinally displaceable on said screw shaft when said screw shaft is turned by said motor, means forming a curved slot and projection means connected with an end one of strip-shaped elements and moveable by said nut vertically so that when said nut is displaced on said screw shaft, said projected means is guided by said arcuate slot and turn said end strip-shaped element therefore all other strip-shaped elements arcuatly to move said strip-shaped elements from said inoperative position to said operative position.

7. A device as defined in claim 6, wherein said nut has a vertical groove, said projecting means including a projection vertically displaceable in said groove.

8. A device as defined in claim 6, wherein said end strip-shaped element has a holder, said projection means including a projection fixedly connected with said holder.

9. A device for screening a vehicle window, comprising a plurality of strip-shaped elongated elements together forming a screening element and having two opposite ends, said strip-shaped elements being connected with one another in a region of one of their ends and pivotal relative to one another from an inoperative position in which the opposite ends are located near one another and said strip-shaped elements are coextensive to one another and extend substantially horizontally, and an operative position in which the opposite ends of said strip-shaped element are spaced from one another circumferentially said screening elements forms a segment arranged to be located near a vehicle window so as to screen the vehicle window; means for moving said strip-shaped elements between said inoperative and said operative positions and including electric motor means; and a screw shaft turnable by said electric motor, a nut longitudinally displaceable on said screw shaft when said screw shaft is turned by said motor, means forming a curved slot and projection means connected with an end one of strip-shaped elements and moveable by said nut vertically so that when said nut is displaced on said screw shaft, said projected means is guided by said arcuate slot and turn said end strip-shaped element therefore all other strip-shaped elements arcuately to move said strip-shaped elements from said inoperative position to said operative position.

10. A device as defined in claim 9, and further comprising means for supporting rearwardly said strip-shaped elements in said operative position so as to prevent their rearward buckling.

11. A device as defined in claim 10, wherein said supposing means include a rigid strip pivotally connected with an end one of said strip-shaped elements at one end and moveable at the other end.

12. A device as defined in claim 11, and further comprising a box in which said strip-shaped elements are arranged in said inoperative position, said box being provided with a slot, said other end of said rigid strip having an engaging formation moveable in said slot during movement of said screening element between said operative position and said inoperative position.

13. A device as defined 9, wherein said nut has a vertical groove, said projecting means including a projection vertically displaceable in said groove.

14. A device as defined in claim 9, wherein said end strip-shaped element has a holder, said projection means including a projection fixedly connected with said holder.

* * * * *